United States Patent [19]

Busch

[11] Patent Number: 5,008,976

[45] Date of Patent: Apr. 23, 1991

[54] DIGITAL APPARATUS HAVING A DISPLAY SECTION ADJUSTED BY A HINGE ASSEMBLY WITH ROLLING RESISTANCE

[75] Inventor: John P. Busch, Austin, Tex.

[73] Assignee: Dell Corporate Services Corporation, Austin, Tex.

[21] Appl. No.: 318,575

[22] Filed: Mar. 3, 1989

[51] Int. Cl.$^5$ .................. E05D 11/04; E05C 17/64
[52] U.S. Cl. ........................... 16/276; 16/337; 16/342
[58] Field of Search .............. 16/276, 337, 338, 340, 16/342, DIG. 33

[56] References Cited

U.S. PATENT DOCUMENTS

| 2,635,281 | 4/1953 | Feldberg | 16/276 |
| 4,730,364 | 3/1988 | Tat-Kee | 16/337 |
| 4,829,633 | 5/1989 | Kassher | 16/340 |

FOREIGN PATENT DOCUMENTS

| 1345146 | 10/1963 | France | 16/340 |
| 6017 | 3/1910 | United Kingdom | 16/276 |
| 482755 | 4/1938 | United Kingdom | 16/340 |

Primary Examiner—Robert L. Spruill
Assistant Examiner—Carmine Cuda
Attorney, Agent, or Firm—Thomas G. Devine

[57] ABSTRACT

A hinge assembly has a plurality of rollers which are pressed against an elastic washer by a shaft. The rollers and elastic washer are contained within a cylindrical retainer which is held in a fixed position relative to a first bracket, while the shaft is held in a fixed position relative to a second bracket so that, when either or both the first and second brackets are moved relative to each other, the roller move around the outside diameter of the shaft resisted by the elastic washer, providing a smooth resistance to the movement of the first bracket and/or second bracket relative to the other. An electronic digital device, having a display section with an adjustable viewing angle utilizing the improved hinge assembly, is shown in which the hinge assembly provides a smooth resistance for the movement of the display section relative to the base of the device.

19 Claims, 5 Drawing Sheets

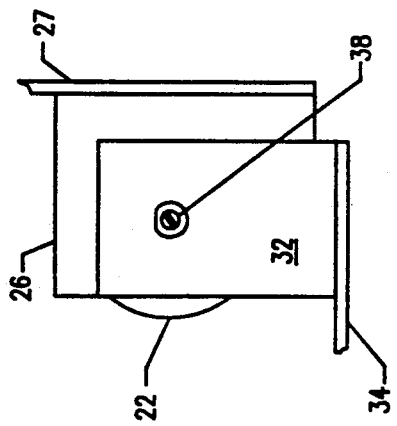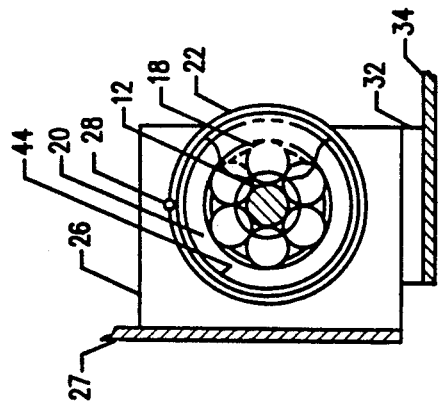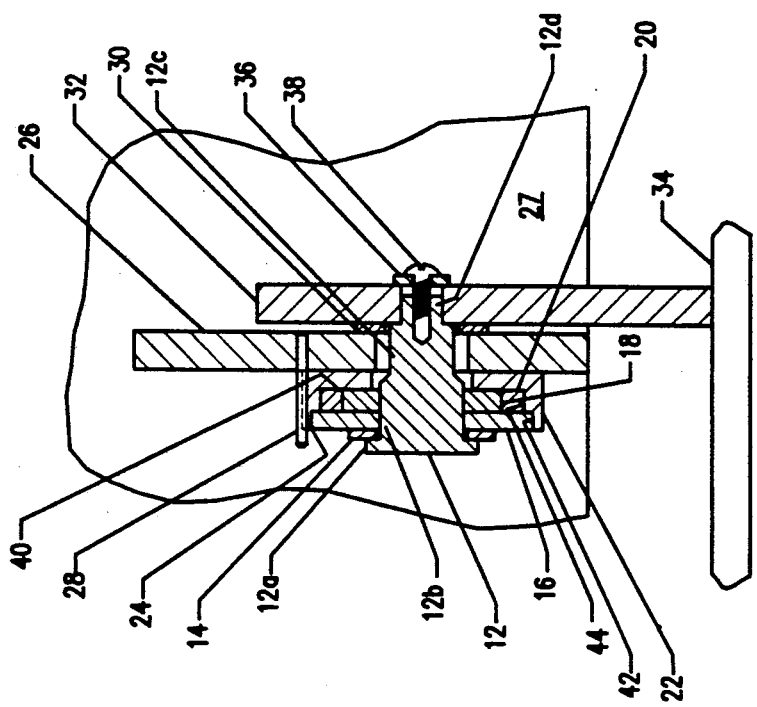

DIGITAL APPARATUS HAVING A DISPLAY SECTION ADJUSTED BY A HINGE ASSEMBLY WITH ROLLING RESISTANCE

BACKGROUND OF THE INVENTION

1. Field of the Invention

This invention relates generally to an improved hinge assembly and, more particularly, to a hinge assembly which is suitable for use in connection with an electronic digital device.

2. Description of the Prior Art

Hinges, per se, are well-known in the prior art. It is well known, for example, that prior hinges may be used to fasten two members to allow them to move from a first position to other positions in which one member has moved relative to the other. A door and its pivotal connector to a door frame provides a very common example of a hinge. Hinges, however, are used in many applications, including in electronic digital devices such as digital computers and terminals.

Digital computers and terminals are also well known in the prior art and are commercially available from a number of manufacturers. Computers and terminals may be portable and those portable units commonly have a display section that has an adjustable viewing angle with respect to the base of the device. These prior art devices generally utilize a type of brake mechanism which is based upon sliding friction to provide the hinge's resistance to movement. Such a sliding frictional force is often developed and maintained through the use of metal springs in different sizes and shapes. Such brake mechanisms, because they utilize sliding friction, usually cause excessive wear to the hinge and are not particularly stable during hard vibrations. Moreover, the hinges utilizing brake mechanisms tend to provide a constantly degrading level of resistance as the hinge material is worn away through use. Another limitation of such hinge devices is that they are "hard mounted" which means that they provide no shock or vibrational protection to a portable computer or terminal. Vibrations may result from a number of sources, especially the means of transportation used when moving a portable electronic device, such as those which often result when the device is in a moving automobile, train, or airplane.

A number of prior art hinges have various disadvantages. Some hinges which are used in portable electronic devices leave a large amount of free play before any resistance is felt by the user. Other types of hinges tend to develop a dragging or scratching which is felt by the user and may even become audible. Other hinges allow rotational movement of the members only in discrete steps through the use of a ratchet-type of mechanism or a detente. Therefore, if the optimal viewing angle for a particular user is between two discrete ratchet steps, the user must choose a position which is not optimal.

BRIEF SUMMARY OF THE INVENTION

An elastic roller assembly positioned around a shaft forms an improved hinge. The shaft extends through axially-aligned openings in a first and second bracket, the shaft being secured to the second bracket to prevent rotation with respect to the second bracket. The elastic roller mechanism is made up of a cylindrical retainer centrally mounted on the shaft and having an inner retaining surface. The plurality of rollers and elastic material retained between the shaft and the inner retaining surface, and surrounding the shaft, where the rollers press into the elastic material, forms a hinge having smoother resistance to any movement between the two brackets. In this preferred embodiment, the improved hinge is connected between the display panel and the base of an electronic digital device having a display section with an adjustable viewing angle for providing any angle desired. Also, in this preferred embodiment, the improved hinge assembly has a single elastic washer whose outside surface contacts and is held in position by the inner surface of the cylindrical retainer, and whose inner surface contacts the plurality of rollers which are positioned around the shaft. When the cylindrical retainer (and the elastic washer) moves, the rollers roll against the elastic washer, providing a very smooth resistance. Since the first bracket is attached to the display section and the second bracket is attached to the base, smooth resistance is felt in movement between the display section and the base.

A second embodiment of an improved hinge assembly involves a single elastic washer which fits directly around the shaft and around which are positioned the rollers, held in place by the retaining surface of the cylindrical retainer. When the cylindrical retainer moves, the relative motion between the elastic washer and the rollers again provides a smooth resistance to the motion.

Still a third embodiment utilizes two elastic washers, one fitting around the shaft and the other fitting against the inner retaining surface of the cylindrical retainer with rollers positioned between the two washers. When the cylindrical retainer turns, the rollers roll against each of the washers, providing a smooth resistance to the motion.

The improved hinge has application to any two members that are to be rotated relative to each other.

In this preferred embodiment, the improved hinge is used in a portable computer having a display section with an adjustable viewing angle, for permitting the user to move the display section into any desired viewing angle. The invention is, of course, applicable to electronic terminals and any other digital computer with an adjustable viewing angle for its display section.

Accordingly, it is the object of this invention to provide a small, lightweight hinge assembly which provides an adjustable viewing angle for the display section of an electronic digital device.

Another object of the invention is to provide a hinge assembly with a smooth resistance over the hinge assembly's entire range of motion so that a first member may be adjusted by the user to any desired angle with a second member.

These and other objects will be made evident in the detailed description that follows.

BRIEF DESCRIPTION OF THE DRAWINGS

FIG. 3. is a detailed sectional view of the hinge assembly.

FIG. 4. is a side view of the hinge assembly.

FIG. 5. is a cut-away side view of the hinge assembly.

DETAILED DESCRIPTION OF THE INVENTION

The improved hinge assembly of this invention provides for any desired setting between two members that rotate with respect to each other, for example the display section of a computer or terminal with respect to its base. The hinge assembly provides for an infinite number of settings between the display section and the base ranging from the closed position to the fully opened position.

Figure 1A:
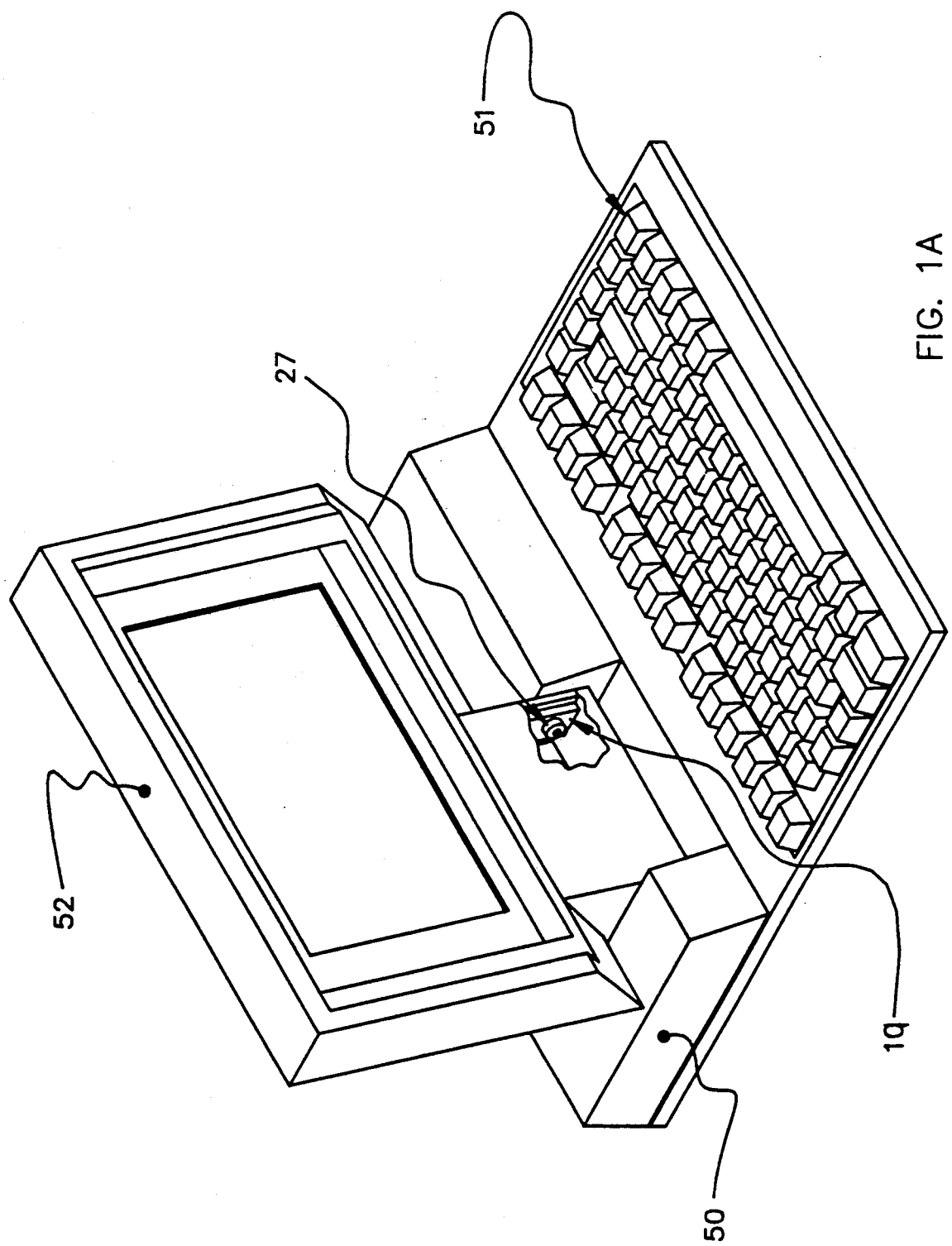
FIGS. 1A. and 1B. are isometric views of portable computers, each with a cut-away view of the improved hinge assembly.
Figure 1B:
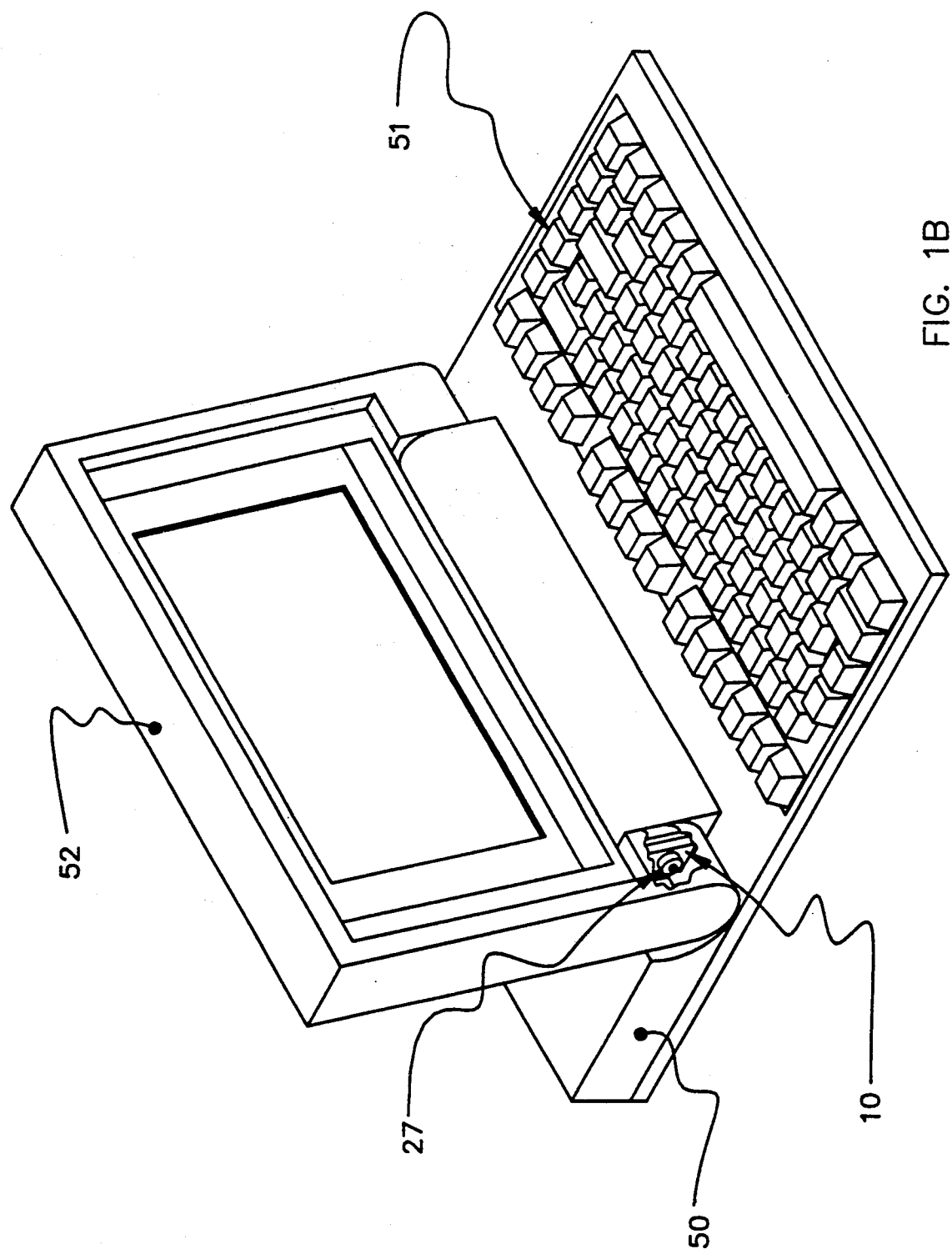

FIGS. 1A and 1B illustrate, in this preferred embodiment, portable computers, each having a cut-away view of the improved hinge assembly 10. FIGS. 1A and 1B represent portable computers, desktop computers, terminals, and the like. The display sections 52 are shown in the open position, in place at some angle (greater than 90 degrees) relative to their corresponding bases 50. Each base 50 is shown having a keyboard 51.

Figure 2:
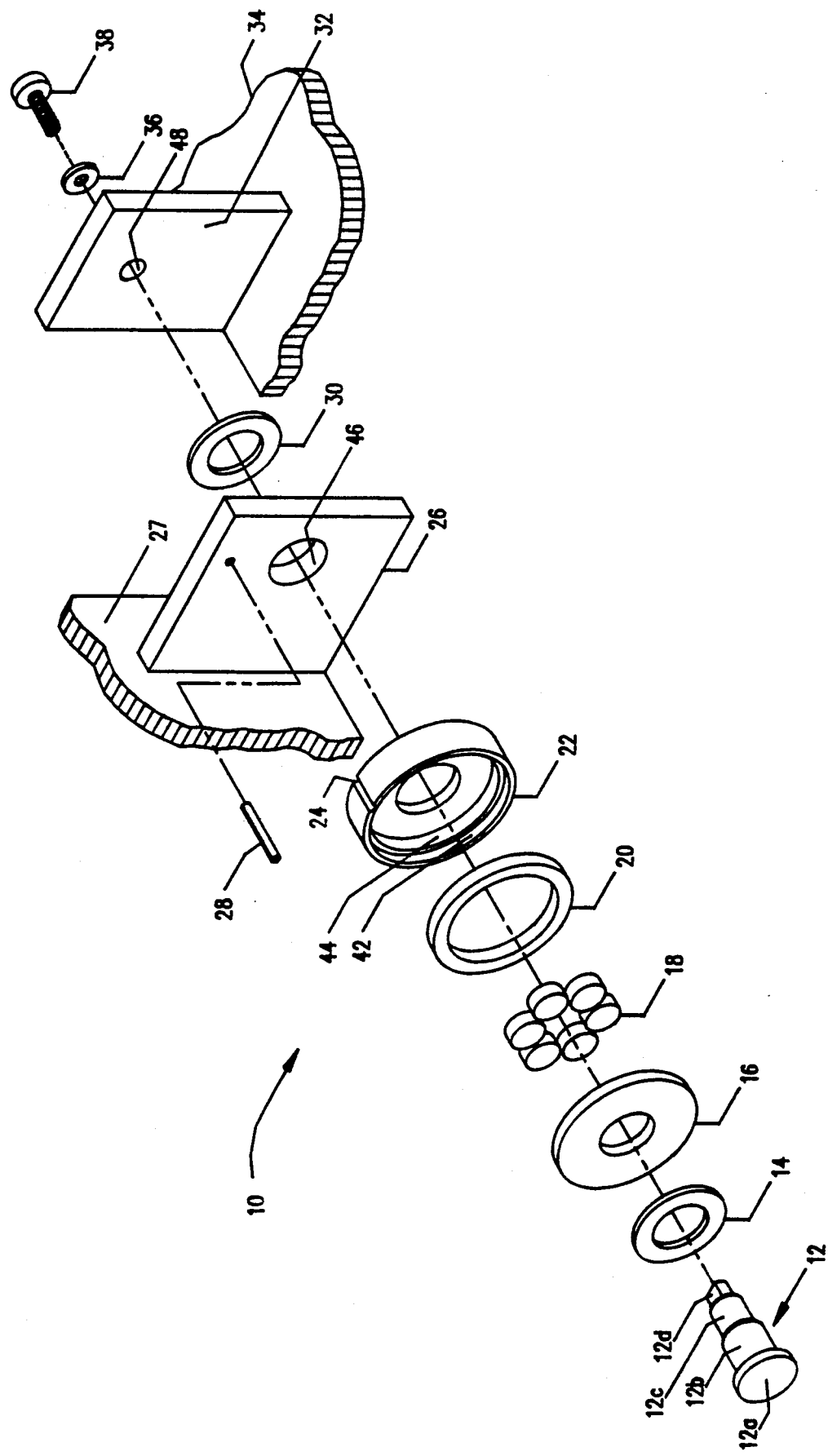
FIG. 2. is an exploded view of the improved hinge assembly.

Improved hinge assembly 10 is shown in exploded detail in FIG. 2. Brackets 26 and 32 are shown having openings 46 and 48 therethrough, respectively. Bracket 26 is attached to member 27 and bracket 48 is attached to member 34. In this preferred embodiment, member 27 is attached to the display section 52 of FIGS. 1A and 1B, bracket 34 is attached to base 50 of FIGS. 1A and 1B. Washer 30 separates brackets 26 and 32. It therefore can be seen that any relative rotation between brackets 26 and 32 causes a relative motion between members 27 and 34.

Shaft 12 is shown having head 12a, bearing 12b, shoulder 12c, and shaft end 12d. Shaft end 12d is keyed to fit into opening 48 in bracket 32 so that no rotation can occur between shaft 12 and bracket 32. Shaft end 12d is secured by screw 38 and washer 36.

Cylindrical retainer 22 is shown having inner diameter 42 and inner retaining surface 44. Cylindrical retainer 22 is fastened to bracket 26 by way of pin 28 which engages bracket 26 at one end and cylindrical retainer 22, through slot 24, at the other end, so the cylindrical retainer 22 and bracket 26 cannot rotate with respect to each other. Cylindrical retainer 22 could be fastened to bracket 26 by many other means such as rivets, screws, cement, etc.

Elastic washer 20 fits within cylindrical retainer 22 against inner retaining surface 44. A plurality of rollers 18 fit within the inner diameter of elastic washer 20 to surround bearing 12b of shaft 12. Cover 16 fits within inner diameter 42 of cylindrical retainer 22, closing and completing the elastic roller mechanism 40 made up of cylindrical retainer 22, flexible washer 20, rollers 18, and cover 16. Bearing 12b of shaft 12 passes through washer 14 and cover 16. In this preferred embodiment, rollers 18 are made of engineering plastic. They could also be made of metal or other hard material.

Elastic washer 20, in this preferred embodiment, is made of an elastomeric material having a durometer of about 55. A rubber, rubber alloy, or thermoplastic elastic material may be used. Washer 20 must be made of material that is relatively non-compressible when wholly contained so that it can only be displaced, the displacement then providing the smooth resistance which is a function of the hinge assembly 10.

The improved hinge assembly 10 is shown as assembled in FIG. 3. Shaft 12 is disposed through washer 14 and through cover 16 at bearing 12b, with head 12a contacting washer 14. Rollers 18 are shown bearing against bearing 12b within flexible washer 20, which is maintained in place within cylindrical retainer 22 at inner retaining surface 44, forming elastic roller mechanism 40. Screw 38 is shown in place in shaft end 12d of shaft 12 to keep shaft 12 in place. Shaft 12 is kept in place in this preferred embodiment as shown. Obviously, it could be attached to bracket 32 in many other forms, such as dowels, screws, cement, etc. Pin 28 is shown in place in bracket 26 and resting in groove 24 of cylindrical retainer 22.

Referring now to FIG. 4, bracket 26 is attached to member 27 which is displaced at a 90-degree angle from member 34. When hinge assembly 10 is used in connection with a portable computer or a terminal, member 27 is attached to display section 52 and member 34 is attached to base 50 (FIGS. 1A and 1B). In the first "closed" position, display section 52 will be substantially parallel to base 51. When the portable computer or terminal is in a second "open" position, member 27 will often rest at an angle of 90 degrees or more from member 34, depending on the user's preference.

FIG. 5 is a cut-away view of hinge assembly 10 with member 27 shown in position at a 90-degree angle to member 34. Rollers 18 are shown in place within flexible washer 20 which, in turn, is held in place in cylindrical retainer 22.

Figure 6:
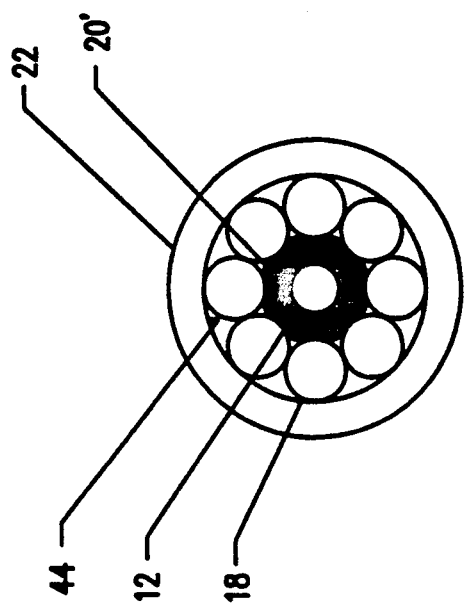
FIG. 6. is a cut-away side view of another embodiment of the hinge assembly.

FIG. 6 illustrates rollers 18 surrounding flexible washer 20' which, in turn, surrounds shaft 12, all held in place within cylindrical retainer 22. FIG. 6, therefore, illustrates an alternate embodiment of the invention in which rollers 18 press into flexible washer 20' to provide a smooth resistance to rotation.

Figure 7:
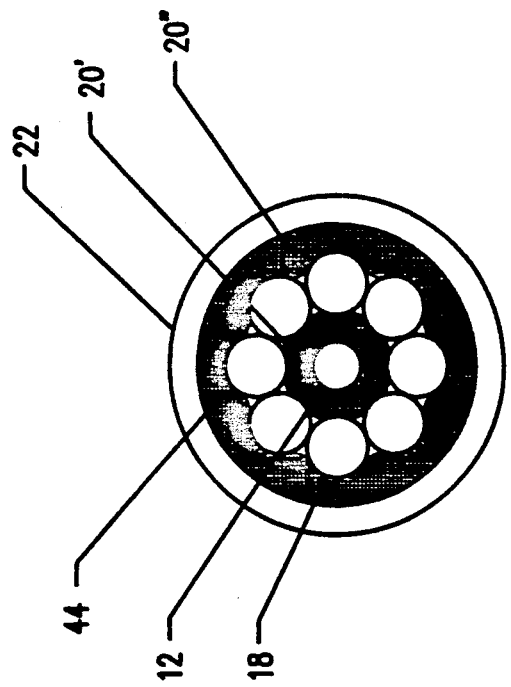
FIG. 7. is a cut-away side view of still another embodiment of the hinge assembly.

FIG. 7 illustrates still another embodiment which is similar to the embodiment shown in FIG. 6 except that flexible washer 20" is located between rollers 18 and inner retaining surface 44 of cylindrical retainer 22.

It should be noted that, in this preferred embodiment, an approximate 30 percent compaction results when the radial width of elastic washer 20 (from its center) is reduced by approximately 30 percent as a result of having rollers 18 pressed along its radius. Decent results may be achieved with compaction levels generally between approximately 25 percent and 45 percent. The diameter and length of rollers 18 may be varied for different applications. For example, the best results have been achieved when the length of rollers 18 is chosen so that rollers 18 fit within the depth of the inner diameter of elastic washer 20. Also, six or more rollers 18 is preferable.

MODE OF OPERATION

Referring to FIGS. 2, 3, and 5, it can be seen that when rotational force is applied to member 27, bracket 26 will rotate, causing cylindrical 22 to rotate. The rotation of cylindrical retainer 22 causes flexible washer 20 to rotate. Rollers 18, however, have compacted elastic washer 20 and, therefore, retard its rotation. By so retarding rotation, a smooth and uniform resistance is provided to the rotary motion and, when the rotary force is removed, an effective lock is also provided.

In the embodiment shown in FIG. 6, the rollers 18 tend to move when cylindrical retainer 22 is rotated, again providing smooth resistance between between rollers 18 and elastic washer 20'.

In the embodiment shown in FIG. 7, rotation of cylindrical retainer 22 causes resistance between washers 20' and 20" and rollers 18, again providing smooth resistance.

Those skilled in the art may elongate the rollers, may change the number of rollers, may elongate the elastic washers, may change the number of elastic washers, may change the hardness of the rollers, and/or may change the elasticity of the washers, all without departing from the scope and spirit of this invention which is limited only by the appended claims.

The invention claimed is:

1. A hinge assembly for rotation between a fully closed position and a fully opened position comprising:
   (a) a first bracket having an opening therethrough;
   (b) a second bracket having an opening therethrough, the opening of the first bracket and the opening of the second bracket being axially aligned;
   (c) a shaft extending through the openings in the first and second brackets, respectively, the shaft and the opening in the second bracket being configured to prevent rotation therebetween; and
   (d) an elastic roller mechanism surrounding the shaft and having means for engaging one of the first or second brackets to provide any desired fixed position between the first and second brackets when a rotational force is selectively impressed therebetween and selectively removed therefrom, the mechanism including:
      a cylindrical retainer having an inner retaining surface and a central opening through which the shaft passes,
      a plurality of cylindrical rollers, and
      elastic means, retained between the shaft and the inner retaining surface, the plurality of rollers surrounding the shaft and positioned to press into the elastic means.

2. The assembly of claim 1 wherein the elastic means comprises an elastic washer having an outer surface contacting the inner retaining surface, and an inner surface, the plurality of rollers being positioned around the shaft and pressed into the inner surface of the elastic washer.

3. The assembly of claim 2 wherein the first bracket is attached to the outer surface of the cylindrical retainer to prevent rotation therebetween so that when a rotational force is applied between the first and second brackets, the cylindrical retainer rotates with respect to the shaft.

4. A hinge assembly for rotation between a fully closed position and a fully opened position comprising:
   (a) a first bracket having an opening therethrough, wherein the first bracket is attached to the outer surface of the cylindrical retainer to prevent rotation therebetween so that when a rotational force is applied between the first and second brackets, the cylindrical retainer rotates with respect to the shaft;
   (b) a second bracket having an opening therethrough, the opening of the first bracket and the opening of the second bracket being axially aligned;
   (c) a shaft extending through the openings in the first and second brackets, respectively, the shaft and the opening in the second bracket being configured to prevent rotation therebetween; and
   (d) an elastic roller mechanism surrounding the shaft and having means for engaging one of the first or second brackets to provide any desired fixed position between the first and second brackets when a rotational force is selectively impressed therebetween and selectively removed therefrom, the mechanism including:
      a cylindrical retainer having an inner retaining surface and a central opening through which the shaft passes,
      a plurality of rollers, and
      elastic means, retained between the shaft and the inner retaining surface, the plurality of rollers surrounding the shaft and positioned to press into the elastic means wherein the elastic means comprises an elastic washer having an outer surface contacting the inner retaining surface, and an inner surface, the plurality of rollers being positioned around the shaft and pressed into the inner surface, of the elastic washer, and wherein the plurality of rollers is disposed so that each roller contacts adjacent rollers.

5. The assembly of claim 4 wherein each of the plurality of rollers comprises an engineering plastic roller.

6. The assembly of claim 5 wherein the elastic washer comprises an elastomeric washer.

7. The assembly of claim 6 wherein the first and second brackets are flat sections, positioned in parallel.

8. An electronic digital device having a base, and a display section with an adjustable viewing angle, comprising:
   (a) a first bracket, attached to the display section, having an opening therethrough;
   (b) a second bracket, attached to the base, having an opening therethrough, the opening of the first bracket and the opening of the second bracket being axially aligned;
   (c) a shaft extending through the openings in the first and second brackets, respectively, wherein the shaft and the second bracket are connected to prevent rotation therebetween; and
   (d) an elastic roller mechanism surrounding the shaft and having means for engaging one of the first or second brackets to provide any desired viewing angle of the display section when a rotational force is applied between the base and the display section, and then removed, wherein the elastic roller mechanism includes:
      a cylindrical retainer having an inner retaining surface and a central opening through which the shaft passes,
      a plurality of cylindrical rollers, and
      elastic means, retained between the shaft and the inner retainer surface, the plurality of rollers surrounding the shaft and positioned to press into the elastic means.

9. The device of claim 8 wherein the elastic means comprises an elastic washer having an outer surface contacting the inner retaining surface, and an inner surface, the plurality of rollers being positioned around the shaft and pressed into the inner surface of the elastic washer.

10. The device of claim 9 wherein the first bracket is attached to the inner surface of the cylindrical retainer to prevent rotation therebetween so that when a rotational force is applied between the base and the display section, the cylindrical retainer rotates with respect to the shaft.

11. A portable computer having a base, and a display section with a viewing angle adjustable with respect to the base, from a fully closed to a fully opened position, comprising:
 (a) a first bracket, attached to the display section, having an opening therethrough;
 (b) a second bracket, attached to the base, having a keyed opening therethrough;
 (c) a stationary shaft extending through the openings in the first and second brackets, keyed at its end to engage the second bracket to prevent any rotation therebetween, and allowing the first bracket to rotate with respect to the shaft; and
 (d) an elastic roller mechanism surrounding the shaft, including a cylindrical retainer having an inner retaining surface and a central opening through which the shaft passes, a plurality of cylindrical rollers, and an elastic washer with an outer surface contacting and retained by the inner retaining surface and an inner surface, the plurality of rollers being positioned around the shaft and pressed into the inner surface of the elastic washer, whereby rotation of the display section with respect to the base causes rotation of the cylindrical retainer and of the elastic washer, causing resistance to the rotation by the plurality of rollers pressing into the elastic washer.

12. A hinge assembly for rotation between a fully closed position and a fully opened position comprising:
 (a) a first bracket having an opening therethrough;
 (b) a second bracket having an opening therethrough, the opening of the first bracket and the opening of the second bracket being axially aligned;
 (c) a shaft extending through the openings in the first and second brackets, respectively, the shaft and the opening in the second bracket being configured to prevent rotation therebetween; and
 (d) an elastic roller mechanism surrounding the shaft and having means for engaging one of the first or second brackets to provide any desired fixed position between the first and second brackets when a rotational force is selectively impressed therebetween and selectively removed therefrom, the mechanism including:
  a cylindrical retainer having an inner retaining surface and a central opening through which the shaft passes,
  a plurality of rollers, and
  elastic means, retained between the shaft and the inner retaining surface, the plurality of rollers surrounding the shaft and positioned to press into the elastic means, wherein the elastic means comprises an outer elastic washer having an outer surface contacting the inner retaining surface, and an inner surface, and an inner elastic washer having an inner surface contacting the shaft and an outer surface, the plurality of rollers being positioned between and pressed into the inner surface of the outer elastic washer and the outer surface of the inner elastic washer.

13. A hinge assembly for rotation between a fully closed position and a fully opened position comprising:
 (a) a first bracket having an opening therethrough;
 (b) a second bracket having an opening therethrough, the opening of the first bracket and the opening of the second bracket being axially aligned;
 (c) a shaft extending through the opening in the first and second brackets, respectively, the shaft and the opening in the second bracket being configured to prevent rotation therebetween; and (d) an elastic roller mechanism surrounding the shaft and having means for engaging one of the first or second brackets to provide any desired fixed position between the first and second brackets when a rotational force is selectively impressed therebetween and selectively removed therefrom, the mechanism including:
  a cylindrical retainer having an inner retaining surface and a central opening through which the shaft passes,
  a plurality of rollers, and
  elastic means, retained between the shaft and the inner retaining surface, the plurality of rollers surrounding the shaft and positioned to press into the elastic means wherein the elastic means comprises an elastic washer having an inner surface contacting the shaft, and an outer surface around which and pressed into is the plurality of rollers, held in place by the inner retaining surface.

14. An electronic digital device having a base, and a display section with an adjustable viewing angle, comprising:
 (a) a first bracket, attached to the display section, having an opening therethrough;
 (b) a second bracket, attached to the base, having an opening therethrough, the opening of the first bracket and the opening of the second bracket being axially aligned;
 (c) a shaft extending through the openings in the first and second brackets, respectively, wherein the shaft and the second bracket are connected to prevent rotation therebetween; and
 (d) an elastic roller mechanism surrounding the shaft and having means for engaging one of the first or second brackets to provide any desired viewing angle of the display section when a rotational force is applied between the base and the display section, and then removed, wherein the elastic roller mechanism includes:
  a cylindrical retainer having an inner retaining surface and a central opening through which the shaft passes,
  a plurality of rollers, and
  elastic means, retained between the shaft and the inner retaining surface, the plurality of rollers surrounding the shaft and positioned to press into the elastic means, wherein the elastic means comprises an outer elastic washer having an outer surface contacting the inner retaining surface, and an inner surface, and an inner elastic washer having an inner surface contacting the shaft, and an outer surface, the plurality of rollers being positioned between and pressed into the inner surface of the outer elastic washer and the outer surface of the inner elastic washer.

15. An electronic digital device having a base, and a display section with an adjustable viewing angle, comprising:
 (a) a first bracket, attached to the display section, having an opening therethrough;
 (b) a second bracket, attached to the base, having an opening therethrough, the opening of the first bracket and the opening of the second bracket being axially aligned;
 (c) a shaft extending through the openings in the first and second brackets, respectively, wherein the shaft and the second bracket are connected to prevent rotation therebetween; and (d) an elastic roller mechanism surrounding the shaft and having means for engaging one of the first or second brackets to provide any desired viewing angle of the display section when a rotational force is applied between the base and the display section, and then removed, wherein the elastic roller mechanism includes:

a cylindrical retainer having an inner retaining surface and a central opening through which the shaft passes, a plurality of rollers, and elastic means, retained between the shaft and the inner retaining surface, the plurality of rollers surrounding the shaft and positioned to press into the elastic means, wherein the elastic means comprises an elastic washer having an inner surface contacting the shaft, and an outer surface around which and pressed into is the plurality of rollers, held in place by the inner retaining surface.

16. An electronic digital device having a base, and a display section with an adjustable viewing angle, comprising:

(a) a first bracket, attached to the display section, having an opening therethrough wherein the first bracket is attached to the inner surface of the cylindrical retainer to prevent rotation therebetween so that when a rotational force is applied between the base and the display section, the cylindrical retainer rotates with respect to the shaft;

(b) a second bracket, attached to the base, having an opening therethrough, the opening of the first bracket and the opening of the second bracket being axially aligned;

(c) a shaft extending through the openings in the first and second brackets, respectively, wherein the shaft and the second bracket are connected to prevent rotation therebetween; and (d) an elastic roller mechanism surrounding the shaft and having means for engaging one of the first or second brackets to provide any desired viewing angle of the display section when a rotational force is applied between the base and the display section, and then removed, wherein the elastic roller mechanism includes:

a cylindrical retainer having an inner retaining surface and a central opening through which the shaft passes, a plurality of rollers wherein the plurality of rollers is disposed so that each roller contacts adjacent rollers, and elastic means, retained between the shaft and the inner retaining surface, the plurality of rollers surrounding the shaft and positioned to press into the elastic means, wherein the elastic means comprises an elastic washer having an outer surface contacting the inner retaining surface, and an inner surface, the plurality of rollers being positioned around the shaft and pressed into the inner surface of the elastic washer.

17. The device of claim 16 wherein each of the plurality of rollers comprises an engineering plastic roller.

18. The device of claim 17 wherein the elastic washer comprises an elastomeric washer.

19. The device of claim 18 wherein the first and second brackets are flat sections, positioned in parallel.

* * * * *